US012596062B2

(12) United States Patent
Andres et al.

(10) Patent No.: US 12,596,062 B2
(45) Date of Patent: Apr. 7, 2026

(54) METHOD FOR CLASSIFYING UNKNOWN PARTICLES ON A SURFACE OF A SEMI-CONDUCTOR WAFER

(71) Applicant: Siltronic AG, Munich (DE)

(72) Inventors: Sebastian Andres, Marktl (DE); Robert Hinterleuthner, Burghausen (DE); Rudolf Rupp, Oberjulbach (DE)

(73) Assignee: SILTRONIC AG, Munich (DE)

( * ) Notice: Subject to any disclaimer, the term of this patent is extended or adjusted under 35 U.S.C. 154(b) by 266 days.

(21) Appl. No.: 18/252,201

(22) PCT Filed: Oct. 26, 2021

(86) PCT No.: PCT/EP2021/079647
§ 371 (c)(1),
(2) Date: May 9, 2023

(87) PCT Pub. No.: WO2022/096318
PCT Pub. Date: May 12, 2022

(65) Prior Publication Data
US 2023/0417644 A1     Dec. 28, 2023

(30) Foreign Application Priority Data

Nov. 9, 2020    (EP) ..................................... 20206421

(51) Int. Cl.
*G01N 15/02*        (2024.01)
*G01N 23/2208*        (2018.01)
(Continued)

(52) U.S. Cl.
CPC ......... *G01N 15/02* (2013.01); *G01N 23/2208* (2013.01); *G01N 23/2252* (2013.01);
(Continued)

(58) Field of Classification Search
None
See application file for complete search history.

(56) References Cited

U.S. PATENT DOCUMENTS 5,715,052 A      2/1998 Fujino et al.
6,765,205 B2 *    7/2004 Ochiai .................. H01J 37/265
                                              378/45
(Continued)

FOREIGN PATENT DOCUMENTS

JP        2006303134 A      11/2006
JP        2010071762 A  *   4/2010
TW        202037906 A      10/2020

*Primary Examiner* — Thomas R Artman
(74) *Attorney, Agent, or Firm* — BROOKS KUSHMAN P.C.

(57)                ABSTRACT

Unknown particles on a surface of a semiconductor wafer are classified by applying a range of particles of known chemical composition and different sizes onto a test wafer, measuring the sizes of a plurality of the particles and spectrally analyzing a makeup of the particles by energy-dispersive x-ray spectroscopy, followed by ascertaining a substantive content therefrom; creating a best-fit curve to the size and substantive content of the particles; measuring the particle size of an unknown particle and recording its spectrum by energy-dispersive x-ray spectroscopy and classifying the unknown particle as the result of a comparison of the size and the substantive content of the unknown particle with the best-fit curve.

4 Claims, 1 Drawing Sheet

(51) Int. Cl.
  *G01N 23/2252*     (2018.01)
  *G01N 15/00*      (2006.01)

(52) U.S. Cl.
  CPC ................ *G01N 2015/0038* (2013.01); *G01N 2223/079* (2013.01); *G01N 2223/1016* (2013.01); *G01N 2223/102* (2013.01); *G01N 2223/3037* (2013.01); *G01N 2223/304* (2013.01); *G01N 2223/418* (2013.01); *G01N 2223/6116* (2013.01); *G01N 2223/641* (2013.01); *G01N 2223/652* (2013.01)

(56)         References Cited

U.S. PATENT DOCUMENTS

| | | | | |
|---|---|---|---|---|
| 7,317,521 | B2 * | 1/2008 | Gilton | G01N 21/94 |
| | | | | 435/7.1 |
| 9,696,268 | B2 * | 7/2017 | Sinha | H01J 37/20 |
| 10,043,264 | B2 * | 8/2018 | Greenberg | G06T 7/001 |
| 10,551,320 | B2 * | 2/2020 | Haller | G01N 21/65 |
| 11,263,737 | B2 * | 3/2022 | Sawlani | G06T 7/0004 |
| 2004/0099805 | A1 * | 5/2004 | Ochiai | H01J 37/265 |
| | | | | 250/311 |
| 2005/0062959 | A1 | 3/2005 | Gilton | |
| 2008/0078420 | A1 * | 4/2008 | Wen | H01L 21/02074 |
| | | | | 134/1 |
| 2013/0279794 | A1 | 10/2013 | Greenberg et al. | |
| 2016/0116425 | A1 | 4/2016 | Sinha et al. | |
| 2018/0217065 | A1 | 8/2018 | Haller | |
| 2020/0226742 | A1 | 7/2020 | Sawlani et al. | |
| 2023/0417644 | A1 * | 12/2023 | Andres | G01N 15/0227 |

* cited by examiner

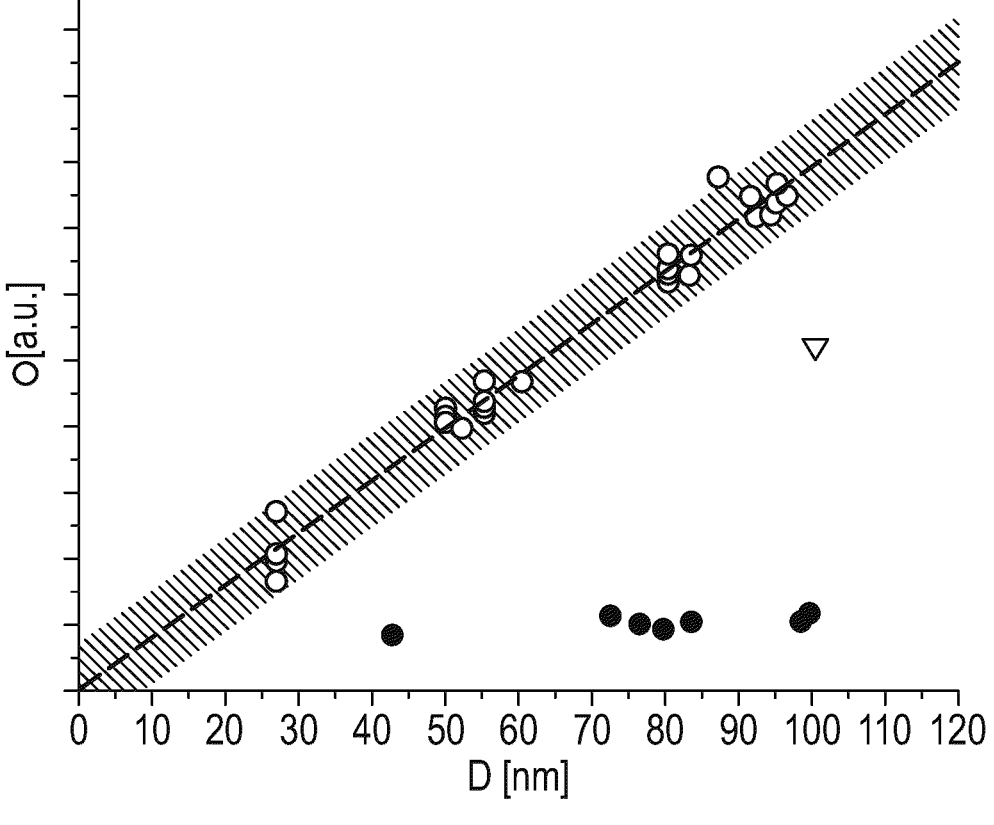

METHOD FOR CLASSIFYING UNKNOWN PARTICLES ON A SURFACE OF A SEMI-CONDUCTOR WAFER

CROSS REFERENCE TO RELATED APPLICATIONS

This application is the U.S. National Phase of PCT Appln. No. PCT/EP2021/079647 filed Oct. 26, 2021, which claims priority to EP Application No. 20206421.8 filed Nov. 9, 2020, the disclosures of which are incorporated in their entirety by reference herein.

BACKGROUND OF THE INVENTION

1 Field of the Invention

The present invention pertains to a method for classifying small extraneous particles on semiconductor wafers.

2. Description of the Related Art

Monocrystalline semiconductor wafers are the foundation of modern-day electronics. During the production of components on the semiconductor wafers, thermal operations and coating steps that are performed which nowadays are highly complex.

Semiconductor wafers, especially silicon semiconductor wafers, are typically produced by first pulling a monocrystalline rod by means of the float zone method (FZ) or the Czochralski method (CZ). The rods produced accordingly are divided into crystal pieces by means of saws suitable for this purpose, such as wire saws, internal diameter saws or band saws, typically in a wire saw or internal diameter saw, and these pieces are then processed to semiconductor wafers.

After further mechanical, chemo-mechanical and/or chemical steps, an epitaxial layer may optionally be applied by CVD.

These semiconductor wafers thus produced are then made available for further component processing.

Because of a narrowing of design rules in component processing, particles are a major negative quality feature in wafer production, with relevance for developments in processing and in cleaning. The shape, position, and chemical composition usually provide a pointer to the origin of the contaminating particles and hence indicate the potential for reducing their incidence in improved processes.

Particles which constitute unwanted contamination of semiconductor wafers are typically imaged by means of an SEM (Scanning Electron Microscope). The combination of SEM and EDX (Energy-Dispersive X-ray spectroscopy) provides a technique in this context which allows simultaneous determination of the location, size and shape, and also the chemical composition, of the particles.

This type of analysis is extremely suitable for particles having a size of more than 200 nm. Particles with smaller sizes are very difficult to classify, as the information about the structure of the particles is absent or affected by great error.

The closer the particle size to the limit of SEM resolution, the more demanding it becomes to classify the particles. For technical reasons, the resolution limit of EDX analysis is lower than that of SEM resolution.

As a result of the continual miniaturization in component processing, however, smaller particles are increasingly coming under the spotlight, since they give rise to problems in semiconductor component fabrication to an increased extent. Avoiding these particles in the production processes is therefore immensely important.

The size range of particle diameters that is of particular interest at the present time is the range between about 15 nm and 200 nm. Particles of this size are no longer classifiable with the techniques prevailing in the prior art.

Patent specification JP 2006 303 134 A2 describes an analytical technique in which extraneous substances on the surface of the semiconductor wafer are visualized by applying weak acid in its vapor phase to the surface of the semiconductor wafer and then using a particle counter to detect the extraneous substances thus adorned. The drawback of this method is that while small particles can indeed be made "visible", in other words detectable or countable, it is not possible to derive any information concerning the origin of the particles.

Patent application US 2005 062 959 AA describes a method in which the small particles to be analyzed serve as polymerization nuclei for a monomer, and the particles enlarged by polymerization are subsequently analyzed with a particle counter. This patent as well is concerned with the detection of particles; information regarding the structure of the particles remains hidden with this method. Moreover, the method in question is an indirect method, allowing only the location of the particles to be measured.

Patent specification U.S. Pat. No. 5,715,052 A describes a method in which a subregion of a small particle has been repeatedly analyzed using different optical conditions with the aid of additional light. It is indeed possible in principle with the aid of this patent specification to classify particles by way of their internal structure. The method described fails, however, as soon as the particles under study are smaller than the resolution of the microscope used.

In the case of the very small particles for study, even the use of an SEM (Scanning Electron Microscope) fails to achieve the object, as it is no longer possible to resolve the internal structure of the particles.

Predominantly, therefore, the only possible classification is that using the spectrum of an energy-dispersive x-ray spectroscopy (EDX). The problem here is that the analyzable EDX measurement signal becomes smaller as the particles under study become smaller. The ambient conditions (for example, the increasing influence of the substrate surface/volume signal components) have an increasingly significant influence on the result of measurement, and therefore make a correct classification more difficult.

In the case of relatively small Si or $SiO_2$ particles, for example, direct classification via EDX spectrum is not possible, since in this case the native oxide of the particles and the native oxide in the surroundings significantly influence the measurement signal. Another significant influence is the high signal component arising from the substrate volume (volume of interaction), which suppresses the small fraction arising from the particle volume, owing to the unfavorable ratio of effective particle volume to substrate volume.

It is an object of this invention, therefore, to provide techniques devoid of the drawbacks of the techniques available in the prior art. The object is achieved by the methods described herein.

The features specified in relation to the above embodiments of the method of the invention can be transposed correspondingly to the products according to the invention. Conversely, the features specified in relation to the above embodiments of the products according to the invention can be transposed correspondingly to the method of the invention. These and other features of the embodiments according to the invention are elucidated in the description of the figures and in the claims. The individual features may be realized either separately or in combination as embodiments of the invention. Moreover, they may describe advantageous embodiments which are protectable in their own right.

SUMMARY OF THE INVENTION

The present invention ascertains the size and makeup of particles which may be present on a semiconductor wafer, by applying particles of known chemical composition and different sizes to a test wafer, ascertaining a size of a plurality of particles of known chemical composition, and recording a spectrum of an energy-dispersive x-ray spectroscopy of the plurality of particles of known chemical composition;

subsequently respectively ascertaining a substantive content of the plurality of particles therefrom, and constructing a best-fit curve of size and substantive content of the particles of known chemical composition; and, ascertaining a particle size of an unknown particle, recording a spectrum of an energy-dispersive x-ray spectroscopy of the unknown particle, and determining therefrom the substantive content of the unknown particle on a semiconductor wafer, and classifying the unknown particle as the result of the comparison of the size and the substantive content of the unknown particle with the best-fit curve.

BRIEF DESCRIPTION OF THE DRAWINGS

FIG. 1 is a plot of oxygen content versus size of particles on a semiconductor surface.

In the invention, particles of known chemical composition but of different sizes are applied to a surface of a substrate (test wafer). This substrate preferably comprises silicon.

Particles are applied to a test wafer preferably by means of a suspension containing the particles. The particles contained in the suspension preferably have a very limited size range between 15 nm and 3000 nm. It should also be ensured that the extraneous substance content (unwanted impurities) is minimal.

BRIEF DESCRIPTION OF THE PREFERRED EMBODIMENTS

The particle suspension may be applied in analogy to the production of calibrating wafers for scattered laser light systems. The particle suspension in this case may be implemented over the whole area or, preferably, in spots (partial areas). The use of a particle counter may be helpful in this case.

An appropriate basis for correct classification of particles are standard particles of known size and chemical composition. Standardized particles are available on the market with a very wide variety of different chemical compositions, such as aluminum, copper or even yttrium.

The particles used preferably have the same chemical composition but different sizes, with the size distribution of the particles used being very preferably between 20 nm and 100 nm.

After the particles have been applied to a test wafer, the size of a number of particles is ascertained, and a spectrum of an energy-dispersive x-ray spectroscopy is recorded. Both items of information are stored.

The energy-dispersive x-ray spectroscopy may be measured using, for example, a Zeiss Auriga 60 SEM-EDX instrument, 70 mm$^2$ with EDAX Elite Super EDX Detector, with the following settings: 5 keV, working distance: 6.1 mm, orifice 30 μm, EDX integration time: 10 s. However, any other equivalent instrument may also be used.

The sizes of the particles of known chemical composition are preferably determined using an electron microscope (Scanning Electron Microscope).

The "size" in this context refers to a diameter determined for the particle; equivalently, it may also refer to an area of the particle or to magnitudes derived directly therefrom.

The spectra obtained are preferably analyzed so that they produce the substantive content of the desired substance. This may be done by analyzing the corresponding peak in the spectrum that is characteristic of the chemical substance.

Particular preference is given to using $SiO_2$ particles, in which case the oxygen content and the size are determined. However, other particles with other, known chemical compositions may also be used for the same purpose.

The substantive content is plotted preferably as a function of the size (diameter, for example), and this plot is used to determine a best-fit curve, which produces a mathematical relationship between substantive content and size in the form of the best-fit curve.

Both the size and the chemical composition of particles of unknown chemical composition are ascertained on the surface of a semiconductor wafer which preferably comprises silicon. In this case, an energy-dispersive x-ray spectroscopy is preferably used. The size of the unknown particles is ascertained preferably using an electron microscope (SEM).

FIG. 1 shows an oxygen measurement (EDX, number of photons in units standardized to 1) obtained from a spectrum of an energy-dispersive x-ray spectroscopy as a function of the measured diameter of spherical particles which are located on a substrate (in this specific case, a silicon semiconductor wafer).

The data points represented by empty circles are values which originate from deliberately applied $SiO_2$ particles. The shaded region indicates the confidence region in which $SiO_2$ particles ought to be situated with 95% probability, on the assumption that for these particles the oxygen content shows a linear dependence on the diameter.

The solid circles relate to particles which exhibit no significant dependence between the oxygen content and the particle diameter. The region in which these particles lie in the FIGURE is significantly different from the aforementioned confidence region.

The data point represented by an empty triangle originates from a particle which apparently exhibits a certain dependence between the oxygen content and its diameter; nevertheless, the data point is outside the above-defined confidence region for $SiO_2$ particles.

FIG. 1 shows, for example, the oxygen content of $SiO_2$ particles, standardized by means of energy-dispersive x-ray spectroscopy, as a function of the diameter (hollow circles). A linear best-fit curve has been fitted so as to illustrate a proportionality between oxygen content and diameter. It is also possible to ascertain a confidence region, as depicted by the shaded portion, so that 95% of the data points are situated within this region.

The position of the measurement points for particles of unknown chemical composition, shown in FIG. 1 (solid circles, hollow triangle) is able to provide information about the chemical composition, without data regarding the structure of the particles.

The data, indicated for example by solid circles, shows that the oxygen content of these particles is evidently largely independent of their size. The inventors have recognized here that an $SiO_2$ particle can with high probability be ruled out as the origin of these particles. These particles would therefore be classified as "non-$SiO_2$ particles".

For data points which fall within a confidence region for $SiO_2$ particles, it can be assumed with a high degree of probability that they are also $SiO_2$ particles. The classification therefore reads "$SiO_2$ particles".

For data points which apparently neither fall within the confidence range for $SiO_2$ nor have an oxygen content independent of the size (e.g., the hollow triangle in FIG. 1), it can be assumed either that these are particles with a certain oxygen content that are not spherical, or that these are particles with a possibly intrinsic oxide layer. This information too may be useful if the aim is to determine the origin for the incidence of particles. Particles of this kind are also classified as "non-$SiO_2$ particles".

The inventors have recognized that the procedure described is especially advantageous when it can be assumed that the semiconductor wafer on which the unknown particles are located carries a certain oxide layer—for example, a native oxide layer. This oxide layer influences the energy-dispersive x-ray spectroscopy. Through the additional information on the size of the particle and through the comparison with a best-fit curve for known particles, this measurement error shows only a small negative effect.

A similar approach can be taken with particles of different chemical composition as well, in order, for example, to determine their probable origin.

The above description of illustrative embodiments should be understood as exemplary. The disclosure made therewith enables the skilled person on the one hand to understand the present invention and its attendant advantages, and on the other hand the understanding of the skilled person extends to obvious modifications and alterations of the structures and methods described. The intention is therefore that the scope of protection of the claims is to cover all such modifications and alterations, and also equivalents.

What is claimed is:

1. A method for classifying unknown particles on a surface of a semiconductor wafer, comprising:

applying $SiO_2$ particles of different sizes in the form of a suspension of the $SiO_2$ particles in a liquid to a test wafer, ascertaining a size of a plurality of the $SiO_2$ particles, and recording a spectrum of an energy-dispersive x-ray spectroscopy of the plurality of the $SiO_2$ particles;

subsequently respectively ascertaining a substantive content of the plurality of the $SiO_2$ particles therefrom, and constructing a best-fit curve of size and substantive content of the plurality of the $SiO_2$ particles; and ascertaining a particle size of an unknown particle by means of an electron microscope, recording a spectrum of an energy-dispersive x-ray spectroscopy of the unknown particle, and determining therefrom the substantive content of the unknown particle on the semiconductor wafer, and classifying the unknown particle as the result of the comparison of the size and the substantive content of the unknown particle with the best-fit curve;

wherein the semiconductor wafer comprises silicon; and wherein the particles are in a size range of 20 nm-200 nm.

2. The method of claim 1, wherein the best-fit curve is a straight line.

3. The method of claim 1, wherein the test wafer comprises silicon.

4. The method of claim 1, wherein the size of the plurality of $SiO_2$ particles is determined by means of an electron microscope.

* * * * *